United States Patent
Steibel et al.

(10) Patent No.: US 6,316,048 B1
(45) Date of Patent: Nov. 13, 2001

(54) METHODS FOR PROVIDING CERAMIC MATRIX COMPOSITE COMPONENTS WITH INCREASED THERMAL CAPACITY

(75) Inventors: James Dale Steibel; David Alan Utah, both of Hamilton, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/613,881

(22) Filed: Jul. 11, 2000

Related U.S. Application Data

(60) Provisional application No. 60/172,875, filed on Dec. 20, 1999.

(51) Int. Cl.$^7$ ............................................... B05D 1/12
(52) U.S. Cl. ..................... 427/180; 427/201; 427/397.7; 427/427; 427/429
(58) Field of Search ........................... 427/180, 201, 427/202, 204, 205, 397.7, 427, 429; 164/75, 67.1, 97, 119, 120; 428/141, 143, 149, 325; 165/905, 920, 133, 134.1, 180

(56) References Cited

U.S. PATENT DOCUMENTS

| | | | |
|---|---|---|---|
| 4,182,412 | * | 1/1980 | Shum . |
| 5,780,157 | * | 7/1998 | Tuffias et al. . |
| 5,792,544 | * | 8/1998 | Klein . |
| 5,900,277 | * | 5/1999 | Fox et al. . |

FOREIGN PATENT DOCUMENTS 59-18394 * 1/1984 (JP) .

* cited by examiner

*Primary Examiner*—Fred J. Parker
(74) *Attorney, Agent, or Firm*—Andrew C. Hess; David L. Narciso

(57) ABSTRACT

A method for enhancing the cooling capability of a turbine component made from a ceramic matrix composite. The method improves the thermal performance of the component by producing a surface having increased cooling capacity, thereby allowing the component to operate at a higher temperature. The method tailors the available surface area on the cooling surface of the composite component by depositing a particulate layer of coarse grained ceramic powders of preselected size onto the surface of the ceramic matrix composite component. The size of the particulate is selectively tailored to match the desired surface finish or surface roughness of the article. The article may be designed to have different surface finishes for different locations, so that the application of different sized powders can provide different cooling capabilities at different locations, if desired. The compositions of the particulates are chemically compatible with the ceramic material comprising the outer surface or portion of the ceramic matrix composite. The particulates are applied using a slurry and incorporated into the article by heating to an elevated temperature without melting the matrix, the particulates or the fiber reinforcement.

26 Claims, No Drawings

METHODS FOR PROVIDING CERAMIC MATRIX COMPOSITE COMPONENTS WITH INCREASED THERMAL CAPACITY

CROSS REFERENCES TO RELATED APPLICATION

This application claims the benefit of U.S. Provisional Application No. 60/172,875, filed Dec. 20, 1999.

STATEMENT REGARDING FEDERALLY SPONSORED RESEARCH & DEVELOPMENT

This invention herein described was made in the performance of work under a NASA contract and is subject to the provisions of section 305 of the National Aeronautics and Space Act of 1958, Public Law 85-568 (72 Stat. 435; 42 USC 2457).

FIELD OF THE INVENTION

The present invention relates generally to gas turbine engines, and specifically to turbine components in the turbine portion of the gas turbine engine made of ceramic matrix composite materials.

BACKGROUND OF THE INVENTION

In order to increase the efficiency and the performance of gas turbine engines so as to provide increased thrust-to-weight ratios, lower emissions and improved specific fuel consumption, engine combustors are tasked to operate at higher temperatures. As the higher temperatures reach and surpass the limits of the material comprising the components in the combustor section of the engine and in the turbine section of the engine, new materials must be developed or methods of cooling the materials must be enhanced.

As the combustor operating temperatures have increased, new methods of cooling the high temperature alloys comprising the combustors and the turbine airfoils were developed. For example, ceramic thermal barrier coatings (TBCs) were applied to the surfaces of components in the stream of the hot effluent gases of combustion to reduce the heat transfer rate and to provide thermal protection to the underlying metal and allow the component to withstand higher temperatures. These improvements helped to reduce the peak temperatures and thermal gradients. Cooling holes were also introduced to provide film cooling to improve thermal capability or protection. Simultaneously, ceramic matrix composites were developed as substitutes for the high temperature alloys. The ceramic matrix composites (CMCs) in many cases provided an improved temperature advantage over the metals, making them the material of choice when higher operating temperatures were desired.

To compete with CMCs, additional improvements have been developed to allow metallic components to operate at temperatures that are comparable to the operating temperature of CMC components. For example, to counter the temperature advantage enjoyed by turbine components made from CMC materials, surface enhancements have been added to the metal components. These enhancements are referred to as turbulators and increase the cooling efficiency of the metal turbine components, allowing them to operate in higher temperature environments or conversely, with reduced cooling requirements. These turbulators increase the cooling efficiency of the component by increasing the surface area over which the channeled cooling air passes so that the metal component does not exceed its limits.

While in theory the temperature capability of turbine components made from CMC materials can similarly be improved by adding like surface enhancements, a cost effective process to apply these surface enhancements onto ceramic matrix composites previously did not exist. Attempts have been made to provide the surface enhancements in the form of turbulators to CMC turbine components by machining, but, as a result of the brittle nature of the ceramic, it is very susceptible to chipping and cracking during the machining process. Thus, it has not been feasible to fully take advantage of the higher temperature capabilities of components made from ceramic matrix composites. Without the economic incentive, the further development and incorporation of components made from ceramic matrix composites has not progressed.

What is needed is an effective process to apply surface enhancements such as turbulators to the surface of ceramic matrix composites.

SUMMARY OF THE INVENTION

Improvements in manufacturing technology and materials are the keys to increased performance and reduced costs for many articles. As an example, continuing and often interrelated improvements in processes and materials have resulted in major increases in the performance of aircraft gas turbine engines, such as the improvements of the present invention. A method for enhancing the cooling capability of a turbine component made from a ceramic matrix composite produces a surface having increased cooling capacity, thereby improving the thermal performance of the component by allowing the component to operate at a higher temperature. The method tailors the available surface area on the cooling surface of the composite component by depositing a particulate layer of coarse grained ceramic powders of preselected size onto the surface of the ceramic matrix composite component. The size of the particulate is selectively tailored to match the desired surface finish or surface roughness of the article. The article may be designed to have different surface finishes for different locations, so that the application of different sized powders can provide different cooling capabilities at different locations, if desired. The compositions of the particulates are chemically compatible with the ceramic material comprising the outer surface or portion of the ceramic matrix composite.

The method that is used to bond the particulates to the outer portion of the ceramic matrix composites is highly dependent upon the method to produce the ceramic matrix composite component. The ceramic matrix composites may be formed by chemical vapor infiltration (CVI), polymer impregnation pyrolysis (PIP) or melt infiltration (MI). The particulates may be applied by slurry processing methods, tape casting or spray forming. When any liquid medium is utilized as a carrier in the application of the particulates to the outer layer of the component, then it is an evaporable liquid that is removed by subjecting the component to relatively low heat, leaving the particulate attached to the outer layer of the component. The attached particles are bonded by heating the component to an elevated temperature sufficient to bond the particulates to the surface without melting either the surface or the particulates. Particulate melting is avoided by the present invention, as the high temperatures required for particulate melting can result in degradation of the reinforcing fibers.

An advantage of the present invention is that surface enhancements such as turbulators can be incorporated into the surface of the CMC component without utilizing potentially damaging machining techniques. The methods of the present invention thus reduce scrap; thereby making them more cost effective.

Another advantage of the present invention is that the effective heat transfer coefficient of the component surface readily can be tailored to vary the heat transfer capabilities across the surface so that a more uniform cooling profile can be achieved and hot spots can be eliminated.

Yet another advantage of the present invention is that the methods of tailoring the surface, as set forth by the present invention is not subject to limitations as a result of part size or part geometry.

Other features and advantages of the present invention will be apparent from the following more detailed description of the preferred embodiment, which illustrate, by way of example, the principles of the invention.

DETAILED DESCRIPTION OF THE PREFERRED EMBODIMENTS

Higher operating temperatures in gas turbine engines require the components in contact with the hot gases of combustion to withstand the higher temperatures. These components typically include the combustor, which is an assembly of a dome, inner and outer liners and cowls, and fastening hardware. Other components include various stages of turbine blades and vanes found in the turbine portion of the engine downstream from the combustor portion of the engine. These components can withstand higher operating temperatures when made from ceramic matrix composite materials that are designed to withstand both the stresses of gas turbine operation as well as the high temperatures experienced by the combustion of fuel in the combustor portion of the engine and the gases which are the products of combustion which flow into the turbine portion of the engine, where power is generated for operation of the engine.

CMCs that have been effectively used for combustors and airfoils include silicon carbide-silicon carbide composites, which is essentially silicon carbide fibers embedded in a silicon carbide matrix. These composites are simply referred to as silicon carbide composites, or simply SiC composites.

As a material, SiC is brittle compared to the superalloy metals that have been used in combustor and airfoil components, but have a temperature advantage over the superalloy metals. SiC also has a heat transfer coefficient similar to the superalloy metals at typical temperatures of turbine operation. By designing the components as ceramic matrix composites, the essentially brittle nature of monolithic SiC can be overcome and SiC/SiC composite components can meet the stress requirements demanded for these applications. Despite these advancements, however, the brittle nature of SiC material has prevented a duplication of the advancements made to improve the cooling effectiveness of similar metal components. The methods of the present invention allow the duplication of these advancements.

The improvements to the cooling effectiveness of CMC components are obtained by depositing a particulate layer over at least a portion of the composite surface using coarse grained powders of sizes, such as 80 mesh and less (about 0.008" and larger). Preferably the coarse grained powders include at least a component of silicon carbide particles, and most preferably, SiC particles having outer surfaces that are carbon rich. These are preferred as the carbon assists in enhancing the bonding during heating. The material forming the particulate layer is selected so as to be chemically compatible with the ceramic matrix and fiber materials. The deposited particulate layer does not have to cover the entire surface, nor does only a single size of the deposited powders have to be deposited. The deposited powders are incorporated into the surface so as to provide a rough surface finish to the part. The rough surface finish increases the available surface area over which cooling air flows so as to increase the cooling efficiency of the part. In practice, different sized particles can be applied to different portions of the composite surface to achieve different heat transfer characteristics at different locations. Alternatively, the different sized particles can be mixed together and applied to the composite surface to achieve a surface finish not otherwise achievable with a single mesh size.

The method of applying the particles to the CMC component surface is highly dependent on the method used to manufacture the component. In a preferred embodiment, a SiC composite can be manufactured by chemical vapor infiltration (CVI), polymer impregnation pyrolysis (PIP) or melt infiltration (MI).

A component made by the CVI method initially starts with a preform of SiC fibers. The matrix is formed around the fibers by slowly depositing a vapor of the matrix material by flowing the vapor over the SiC fibers in an atmosphere having a low but constant atmosphere of the vapor, thereby depositing matrix material onto the fibers. In a preferred embodiment, the matrix material is SiC, which may be formed either in a single reactor run or in multiple furnace runs. SiC is typically deposited in this process at temperatures of around 1830° F. (1000° C.). In the gas phase deposition process, a first precursor gas containing Si and a second precursor gas containing carbon flow into the reactor vessel and at a desired temperature and pressure. Preferred pressures are in the range of about 0.2–2.0 Torr and temperatures are in the range of about 1472–2012° F. (800–1100° C.). The gases condense as SiC matrix material and deposit onto a SiC fiber preform that has been placed in the interior of the reactor by passing gases through a tooled part with apertures or holes in the tooling. If a single run process is used, which involves a heat-up and cool down of the reactor vessel or furnace, then it is possible to add the slurry layer after complete CVI processing. While the slurry layer containing the particulates may be added before the CVI cycle, this is not a preferred approach as the slurry particulates may cause gas-formed SiC to build up on the surface of the slurry and seal the preform, preventing it from achieving optimum matrix density. In this case, a small a mount of silicon powder/particles can be added to the slurry. The particles, preferably of the same size as the slurry particulate may be bonded by reheating the part with the applied slurry layer to a temperature approaching the melting point of Si, that is, about 2600° F. (1410° C.). If multiple CVI cycles are used, then the particulate layer, preferably in the form of a slurry, should be applied prior to the last cycle as the SiC formed from CVI gases and deposited onto the substrate could potentially bond to the particulate layer originally applied as a slurry to the substrate. This process, when repeated in multiple CVI cycles, produces a surface that is smoother and negates the advantages of applying the material, as a particulate to achieve desired surface roughnesses.

SiC composite components can also be made by the PIP process. This process is used to form the SiC matrix by impregnating a fiber preform with a polymer that includes silicon and carbon to yield a silicon carbide after pyrolysis. As used herein, pyrolysis is defined as heating to a necessary temperature to break down the polymer and leave behind a silicon carbide containing residue. Thus, the polymer containing Si and C initially is, in effect, a precursor for SiC. To form a SiC matrix having reduced porosity and increased density, multiple impregnation and pyrolysis cycles are required. The preferred method for applying turbulators to such a surface is to apply a layer of the particulate by the slurry process after a few pyrolysis cycles, at least three, so as to minimize the impact on matrix densification, and use polymer-derived SiC to bond particles. Alternatively, Si can be added to the slurry as a means for bonding the particles to the CMC matrix.

Still another process for forming a SiC composite component is by MI. This is the preferred approach. A porous SiC fiber preform is first coated with Si-doped boron. A preform is then formed by slurry casting carbon and silicon carbide particulates around the laid up SiC fibers in the preform. The preform is relatively porous. The preform is placed into a furnace under a protective atmosphere so that the carbon will not oxidize. The atmosphere can be an inert gas, such as helium or argon, Ni or a vacuum. Si then is melted and allowed to infiltrate both the porous carbon preform and the porous SiC fiber. Particulates of SiC are bonded to the composite produced by this method to incorporate a turbulator into the surface by applying a layer of slurry over that portion of the surface where the surface enhancement is required. The slurry is simply a mixture of the particulates of the desired size with an evaporable liquid that will not result in dissolution of the particles. The ability to use the existing silicon already present from the initial matrix densification step is a convenient means of bonding the particulate layer that remains on the substrate after the liquid evaporates. The particulates are bonded to the outer surface of the component by simply heating to a sufficient temperature to drive off the liquid, typically at temperatures below about 300° F. (150° C.). The particulates are bonded to the surface by reheating the composite to a temperature sufficient to allow residual silicon on the surface to melt and adhere to the particulates, thereby forming a strong bond with the particulates. Silicon melts at about 2600° F. (1425° C.), which is the temperature required to heat the particulates and matrix. The MI method is convenient and cost effective, as it is relatively simple and, as is the case with PIP and CVI, no additional machining was required.

While the best mode of practicing the invention utilized SiC/SiC, the invention can also be used for SiC/C and C/SiC CMC composites. Thus, the present invention also can be practiced with C and SiC as either fiber or matrix.

A roughened surface finish was applied to a SiC/SiC CMC produced by the MI process. SiC particulate layer was bonded to the CMC by applying a slurry layer to the densified CMC. The CMC was then reheated to a temperature in the range of 2600–2700° F. to bond the SiC particulate. The slurry layer was applied by brushing the slurry onto the CMC surface, although any other suitable method of applying the slurry may be used, such as spray methods and tape methods. The slurry was prepared by mixing a SiC powder in a liquid medium with a polymer dispersant. The liquid medium can include ethanol, isopropyl alcohol, acetone, water and suitable mixtures of these, but a mixture of ethanol and 1-1-1-trichloroethane was used as a liquid carrier to apply the slurry layer in this example. It is now preferable to eliminate 1-1-1-trichloroethane as a liquid medium because of health and environmental concerns. Any polymer dispersant can be used, but HYPERMER KD-1® from ICI America was used in this example, which is a polyol. The ratios of the liquid medium to the polymer dispersant to the powder is not critical, as long as the slurry can be applied to the surface of the CMC without running or excessive flow. While 80 mesh particles were used, it is possible to mix finer particles with the 80 mesh to produce a slightly smoother surface if desired, or to use a coarser powder, such as a 40 mesh (about 0.016") or 20 mesh (about 0.033") to produce a rougher surface, either alone or as a mixture with the slightly less coarse particles.

The surfaces of the turbulators made in accordance with the present invention were fairly rough. The application of the slurry using 80-mesh powder produced surfaces in the range of 500–600 micro-inches. Coarser powders are expected to produce correspondingly rougher surface finishes. Any desired or preselected surface finish can be achieved by mixing powders of different sizes together. For example, a smoother surface finish can be achieved by mixing a preselected quantity of finer powders with the 80 mesh powder, while a coarser surface finish can be achieved by mixing a preselected quantity of a coarser powder with the 80 mesh powder. The invention is not limited to mixtures of coarse or fine powders with 80 mesh powders, as any number of powder sizes can be mixed together to achieve a preselected surface finish. The turbulators made in accordance with the present invention by the MI process had an increase in the surface area and measured improvements in heat transfer capability. The particulate layer thus provided a means for controlling surface roughness, and hence, the heat transfer behavior of the CMC. The SiC particulate layer applied as set forth using 80 mesh SiC powder produced an article with a 30% improvement in heat transfer capabilities compared to a similar CMC composite without the application of the particulate layer. Thus a CMC part with turbulators made in accordance with the present invention has a temperature capability of 300–400° F. greater than similar superalloy components.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A method for tailoring the surface area of a ceramic matrix composite by modifying a surface roughness, comprising the steps of:

providing a ceramic matrix composite having ceramic fibers embedded in a ceramic matrix;

providing ceramic particulates of preselected size, the ceramic particulates being chemically compatible with the ceramic matrix composite;

applying the ceramic particulates onto at least a portion of a predetermined surface of the ceramic matrix composite to form a substantially uniform layer on the surface;

incorporating the particulate layer into the surface by heating the ceramic matrix composite to which the layer has been applied to a sufficient temperature to bond the particulates to the surface, thereby providing a surface roughness determined by the preselected size of the particulates.

2. A method for improving the thermal performance of a ceramic matrix turbine component by increasing its surface roughness and surface area, comprising the steps of:

providing a ceramic matrix composite turbine component having ceramic fibers embedded in a ceramic matrix;

providing a slurry of ceramic particulates of preselected size mixed with an evaporable liquid, the ceramic particulates being chemically compatible with the ceramic matrix composite and not soluble in the liquid;

applying the slurry of ceramic particulates onto at least a portion of a predetermined surface of the ceramic matrix composite turbine component to form a substantially uniform layer on the surface;

evaporating the liquid from the surface;

incorporating the particulate layer into the surface by heating the ceramic matrix composite to which the layer has been applied to a sufficient temperature to bond the particulates to the surface, thereby increasing the surface roughness to a preselected value, and the resultant surface area is determined by the preselected size of the particulates.

3. The method of claim 2 wherein the step of providing a ceramic matrix composite turbine component includes steps of:

providing a preform of ceramic fibers;

creating a vapor of the ceramic matrix material; and forming a matrix around the fibers by flowing the vapor of ceramic matrix material through the preform, resulting in a condensation of the vapor onto the fibers.

4. The method of claim 3 wherein the step of providing a preform of ceramic fibers further includes providing a preform of SiC fibers.

5. The method of claim 4 wherein the step of creating a vapor of the ceramic material includes introducing into a reactor vessel at a preselected temperature a first precursor gas of Si at a first preselected pressure, and introducing a second precursor gas of C into the reactor vessel at a second preselected pressure.

6. The method of claim 4 wherein the preselected temperature of the reactor vessel is about 1830° F.

7. The method of claim 5 wherein the step of providing a slurry includes providing a mixture of Si particles and SiC particles in an evaporable liquid.

8. The method of claim 7 wherein the step of incorporating the particulate layer into the surface includes heating to a temperature of about 2600° F.

9. The method of claim 7 wherein the step of providing SiC and Si particles of preselected size includes providing particles of no smaller than 80-mesh particle size to achieve a surface roughness no smoother than about 500 microinches.

10. The method of claim 2 wherein the step of providing a ceramic matrix composite turbine component includes the steps of:

providing a preform of ceramic fibers;

impregnating the preform with a precursor that includes Si and C;

heating the precursor to a temperature sufficient to pyrolyze the precursor and form a SiC matrix around the fibers;

repeating the steps of impregnating and heating until the SiC matrix achieves a preselected density.

11. The method of claim 10 wherein the step of providing a preform of ceramic fibers further includes providing a preform of SiC fibers.

12. The method of claim 10 wherein the step of providing a slurry includes providing SiC particles in an evaporable liquid.

13. The method of claim 12 further including the additional steps of:

impregnating the ceramic matrix composite to which the mixture of particles has been applied with a precursor that includes Si and C; and pyrolyzing the precursor to form SiC, which bonds the particles to the ceramic matrix surface.

14. The method of claim 10 wherein the step of providing a slurry includes providing a mixture of Si particles and SiC particles in an evaporable liquid.

15. The method of claim 10 wherein the step of incorporating the particulate layer into the surface includes heating to a temperature of about 2600° F.

16. The method of claim 10 wherein the step providing a slurry of ceramic particulates of preselected size includes providing particles of no smaller than 80-mesh particle size to achieve a surface roughness no smoother than about 500 microinches.

17. The method of claim 2 wherein the step of providing a ceramic matrix composite turbine component includes the steps of:

providing a porous SiC fiber preform coated with Si-doped boron;

slurry casting a mixture of carbon and silicon carbide around the SiC fibers to form a porous preform;

heating the porous preform under a non-oxidizing atmosphere; and introducing molten silicon into the preform.

18. The method of claim 17 wherein the step of providing a slurry of ceramic particulates includes providing a slurry that includes SiC particles.

19. The method of claim 18 wherein the step of evaporating the liquid from the surface includes heating the component to a temperature of about 300° F.

20. The method of claim 19 wherein the step of incorporating the particulate layer into the surface includes heating the SiC/SiC composite to a temperature of about 2600° F. to melt excess Si introduced into the preform, bonding the SiC particles to the surface of the component on cooling.

21. The method of claim 18 wherein the step of providing a slurry that includes SiC particles of preselected size includes providing particles of no smaller than 80-mesh particle size to achieve surface roughness no smoother than about 500 microinches.

22. The method of claim 2 wherein the step of applying the slurry is a method selected from the group consisting of spraying, brushing and tape application.

23. The method of claim 2 wherein the step of providing a slurry of ceramic particles of preselected size includes providing ceramic particles having a preselected size of about 80-mesh to achieve a surface roughness of about 500 microinches.

24. The method of claim 2 wherein the step of providing a slurry of ceramic particles of preselected size includes providing a mixture of a first quantity of ceramic particles of a first preselected size and a second quantity of ceramic particles of a second preselected size different that the first preselected size to achieve the preselected surface roughness value.

25. A ceramic matrix turbine component having improved thermal performance by tailoring its surface roughness and surface area, formed by the process of:

providing a ceramic matrix composite turbine component having ceramic fibers embedded in a ceramic matrix;

providing a slurry of ceramic particulates of at least one preselected size mixed with an evaporable liquid, the ceramic particulates being chemically compatible with the ceramic matrix composite and not soluble in the liquid;

applying the slurry containing the ceramic particulates onto at least a portion of a predetermined surface of the ceramic matrix composite turbine component which is to have its surface roughness tailored to form a substantially uniform layer on the surface;

evaporating the liquid from the surface, leaving a particulate layer;

incorporating the particulate layer into the surface by heating the ceramic matrix composite to which the layer has been applied to a sufficient temperature to bond the particulates to the surface, thereby increasing the surface roughness of the component and thereby its surface area determined by the preselected size of the particulates.

26. The ceramic matrix composite turbine component of claim 25 wherein the step of providing a ceramic matrix composite includes providing a SiC/SiC composite.

* * * * *